July 20, 1937.                M. BIRKIGT                2,087,832
                            MOTIVE POWER PLANT
                     Filed Aug. 6, 1936            2 Sheets-Sheet 1

INVENTOR
MARC BIRKIGT

Bailey & Carson
ATTORNEYS

July 20, 1937.  M. BIRKIGT  2,087,832
MOTIVE POWER PLANT
Filed Aug. 6, 1936  2 Sheets-Sheet 2
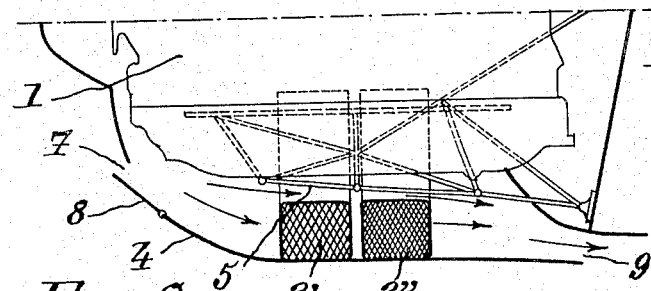
Fig. 7
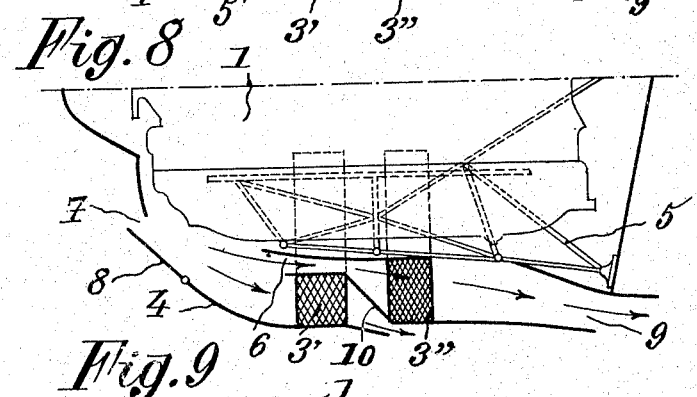
Fig. 8
Fig. 9
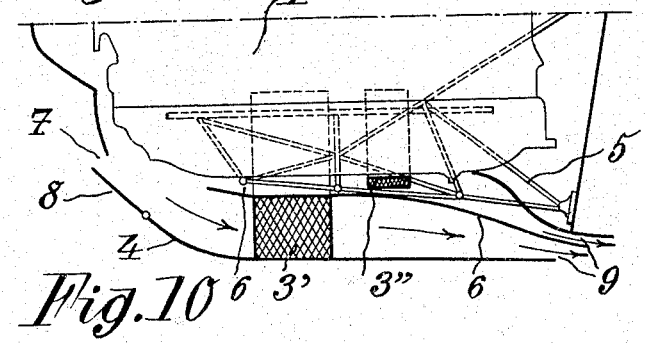
Fig. 10
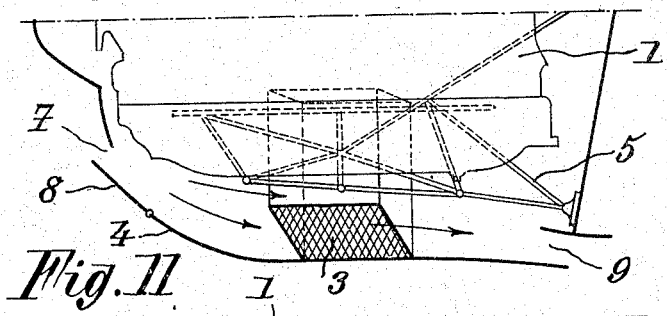
Fig. 11
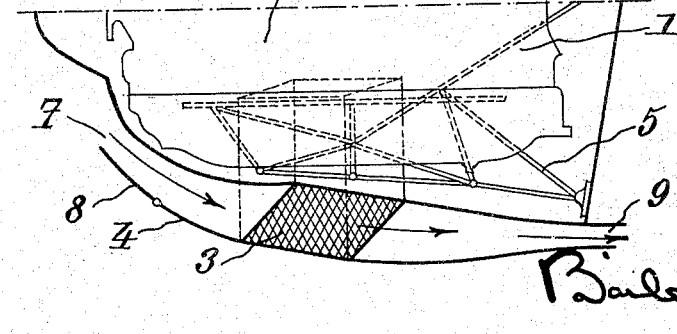
INVENTOR
MARC BIRKIGT
ATTORNEYS Patented July 20, 1937

2,087,832

UNITED STATES PATENT OFFICE 2,087,832

MOTIVE POWER PLANT

Marc Birkigt, Bois-Colombes, France

Application August 6, 1936, Serial No. 94,690
In Belgium December 24, 1935

6 Claims. (Cl. 244—57)

This invention relates to motive-power plants for craft intended for travel through air, and, more particularly, to such plants provided with streamlined cowling, as, for example, those power plants used for aircraft.

The main purpose of the invention is to reduce the drag resistance of such power plants while maintaining their engine-cooling efficiency as high as possible.

The principal object of my invention is to provide a motive-power plant for use on air, land or other craft intended for travel through air, in which the engine-cooling means are located in the closest possible proximity with the walls of the engine and abreast of the same, that is, between the front and rear of said engine, in order to permit the maximum external cleanness in the cowled unit, together with the highest engine-cooling efficiency.

Another object of my invention is to provide a motive power plant of the type defined in which the complete power plant is enclosed in a streamlined cowl, the generatrices of which, at the trailing edge, coincide substantially with those of the engine-supporting member of the craft to be powered, which supporting member may be, for example, the fuselage or nacelle of an aircraft.

A further object of my invention is to provide a power plant as defined above comprising an engine cooled by a circulating fluid, as, for example, by water, the circulating fluid cooling means being located in the closest proximity with the walls of the engine, and the entire unit being enveloped in a streamlined cowl of maximum external cleanness, air inlet and outlet means being provided fore and aft of said circulating fluid means to admit the exact amount of cooling air required, and no more, thus reducing to a minimum the additional drag due to engine cooling.

A still further object of my invention is to provide a power plant of the type defined in which the engine cooling is effected by two fluids, one being a lubricant, and separate cooling means are provided for each fluid, said cooling means being disposed in series or in parallel relation, with respect to the flow of cooling air; the entire power plant being inclosed in a streamlined cowl of maximum external cleanness, air inlet and outlet means being provided to admit the correct amount of cooling air to said cooling means, and internal baffling being provided to direct said cooling air, in the proper proportions, to the different sections of said cooling means.

Further objects and advantages of my invention will appear to a person skilled in the art from the following description, with reference to the accompanying drawings, which description and drawings are given mainly for the purpose of illustration, and are not to be construed as limiting the scope of the invention.

Figs. 7 to 9 inclusive illustrate, in longitudinal and axial cross-section, three other arrangements of water and oil cooling radiators.

Figs. 10 and 11 illustrate two variants concerning the shape of said engine cooling radiators.

Figure 1:
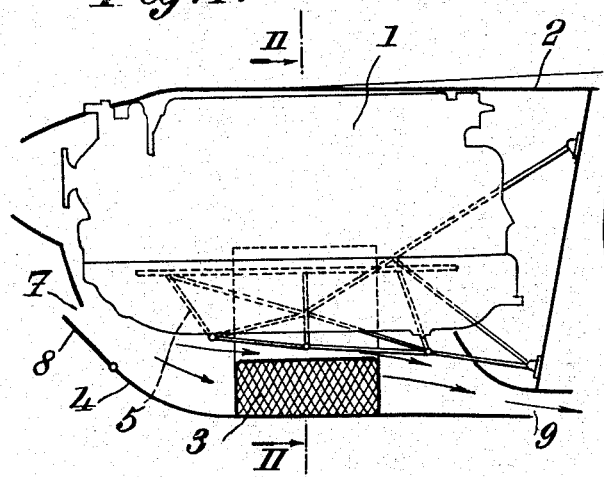
Figs. 1 and 2 illustrate diagrammatically, the first in longitudinal and axial cross-section, the second in transverse cross-section through II—II of Fig. 1, a motive power plant in accordance with one embodiment of my invention.
Figure 2:
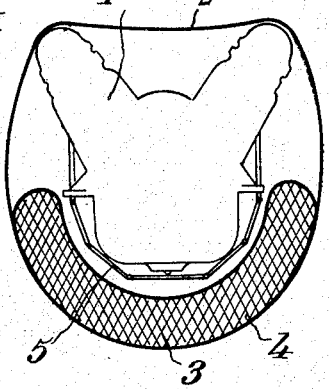

In the embodiment of my invention illustrated diagrammatically in Figs. 1 and 2, I is an engine of the water-cooled V type commonly used in aircraft propulsion, 2 is the front end of the fuselage of an airplane. The circulating water cooling radiator 3 is indicated, by way of example, as a sector of a substantially cylindrical ring which sector envelops a portion of the engine, for example the crankcase, preferably at some convenient point between the front and the rear of the engine. The engine I and its cooling radiator 3 are inclosed within a streamlined cowl 4. Said cowl may optionally be so designed that the generatrices of said cowl at its trailing edge coincide substantially with those of the fuselage of the aircraft at its front end.

The engine I may advantageously be supported in a cradle structure 5 built up of metallic tubes or other pressed or extruded structural shapes, assembled in the form of triangular bracing, to give the greatest structural strength with the lightest weight, said cradle 5 being suspended from the front of the fuselage 2 in any suitable manner. Said engine cradle 5 is preferably designed to follow closely the contour of the walls of the crank case of the engine, and may then serve to support the circulating-fluid cooling radiator 3, which may be suspended directly on the outside of said structure, in the position indicated in Figs. 2, 4, 5, and 6, in which, however, the suspension means for connecting the radiator to said cradle 5 have been omitted.

Air inlet means are provided at 7 at the front end of the cowl 4, and outlet means at 9 at the rear of the same, for the passage of the cooling air which is to flow through the radiator 3. In order to regulate the amount of air forced through the cowling, adjustable flaps may optionally be provided, as shown at 8, to vary the cross-sectional area of the inlet means 7; and similar regulating flaps may also be provided on the outlet means 9. Under certain circumstances, I also provide an inner cowl or baffle 6, for the purpose of leading the air directly to the radiators, and reducing the opportunities of pressure drop through eddying.

Figure 3:
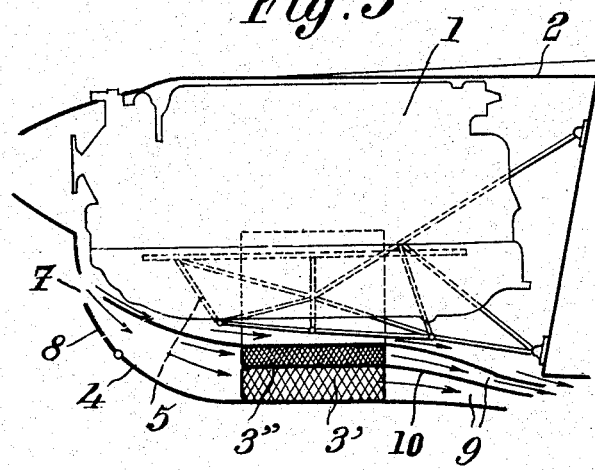
Figs. 3 and 4 illustrate, as above, a second embodiment of my invention, comprising cooling radiators for water and oil.
Figure 4:
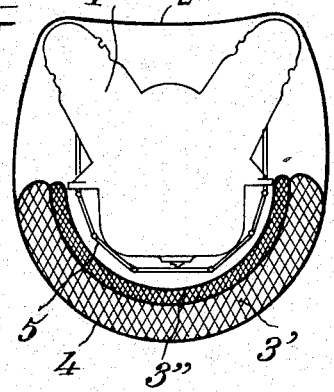
Figure 5:
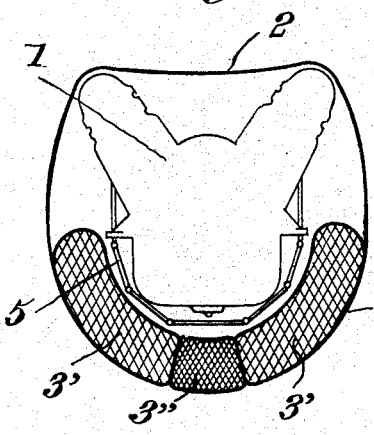
Figs. 5 and 6 illustrate, in transverse cross-section, two other arrangements of water and oil cooling radiators.
Figure 6:
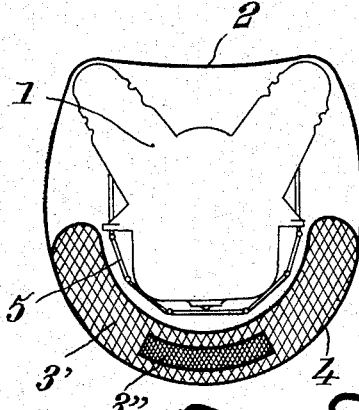

In the embodiment shown in Figures 3 to 9 inclusive, I provide cooling means 3', for the circulating fluid, which is usually water, and also similar means 3" for the lubricating oil. The two radiators may be arranged in many different ways, and supplied with air likewise in different manners. For example, the two radiators may be made substantially concentric, as shown in Figs. 3 and 4, and be set in parallel with respect to the air flow. Or they may be subdivided into adjacent sectors of a single annular assembly, as in Fig. 5; or again the oil radiator may be completely enclosed in the water radiator, as shown in Fig. 6; or one of the radiators, for example the oil cooler, may be set behind the other, as shown in Figs. 7, 8, and 9. In this case, there is a substantial saving in the size of the cowl required, owing to the reduction in the overall radial thickness of the radiators. Air may then be supplied either in series to the two radiators, as indicated in Fig. 7, or in parallel, by means of suitable guiding baffles 6 and 10, as shown in Figs. 3 and 8.

The fluid-cooling radiators may be made of any suitable shape, for example, of square, or rectangular cross-section, as indicated in Figs. 1, 3, 5 to 9 inclusive; or of any other polygonal cross-section, such as indicated in Figs. 10 and 11.

Under certain conditions, as, for example, when it is desired to power a small plane with a very large engine, in which case the problem of locating the necessary cooling radiator capacity within a streamlined cowl may become particularly difficult, said circulating water cooling radiator may be divided into two or more sections disposed as indicated in Fig. 8, except that both sections 3' and 3" are used for water cooling, the oil radiator being suitably located elsewhere, for example in fore and aft sequence with said circulating water cooling units, as indicated in Figs. 8 and 9. By this expedient, the air is admitted to all the water-cooling sections 3', 3" and others in parallel but the radial thickness of said cooling means is reduced to a half or less.

By means of the several improvements described above and illustrated in the figures, I obtain a motive power plant of remarkable external cleanness and low drag, and possessing moreover good engine-cooling efficiency.

I wish it to be understood, however, that I do not desire to be limited to the forms of construction or to the details shown in the drawings and described hereabove, for obvious modifications therein will occur to a person skilled in the art. For example, the invention has been illustrated only in association with a V type aircraft engine. But it may readily be applied to other types of engines, such as, for example, the inverted V, the H or I type engines. In these cases, the cooling radiators will also be located in the closest possible proximity to the walls of the engine, as in the case described herein. In the special case of the inverted V type engine, the arrangement of the cooling radiator will be the same as that shown in the accompanying drawings, with the exception that the whole structure should be rotated through an angle of 180° around the center line of the engine.

What I claim is:

1. In combination with an airplane fuselage a V-shaped engine, mounted in said fuselage, said engine including a crank case, at least one radiator, a streamlined cowl forming a part of the surface of said fuselage and enclosing said engine and said radiator, said radiator being of substantially semicircular shape in cross-section and positioned in the space between the lower side of said crank case and the inner wall of that part of said cowl adjacent said crank case, said radiator surrounding at least partially said crank case and substantially filling up said space.

2. A device according to claim 1, having at least two radiators arranged concentrically.

3. A device according to claim 1, having at least two radiators arranged within different parts of the same sector laterally of each other.

4. A device according to claim 1, having at least two radiators of different dimensions, the smaller radiator being positioned within said semicircular radiator.

5. A device according to claim 1, having at least two radiators positioned one behind the other, said cowl having an air inlet opening common to all of said radiators, and means within said cowl for dividing the air into several substantially parallel currents and for distributing each current to its respective radiator.

6. A device according to claim 1, having at least two radiators positioned one behind the other, said cowl having an air inlet opening common to all of said radiators, and means within said cowl for dividing the air into several substantially parallel currents and for distributing each current to its respective radiator, and a channel intermediate said crank case and the first radiator, passing one of said currents to the second radiator.

MARC BIRKIGT.